United States Patent [19]

Taylor

[11] 4,302,106
[45] Nov. 24, 1981

[54] BALLOON TESTING DEVICE

[75] Inventor: Glenn N. Taylor, Cary, Ill.

[73] Assignee: The Kendall Company, Boston, Mass.

[21] Appl. No.: 109,435

[22] Filed: Jan. 4, 1980

Related U.S. Application Data

[62] Division of Ser. No. 920,105, Jun. 28, 1978, Pat. No. 4,212,192.

[51] Int. Cl.³ .............................................. G01N 21/88
[52] U.S. Cl. .................................... 356/240; 356/244
[58] Field of Search ................. 356/237, 239, 240, 244

[56] References Cited

U.S. PATENT DOCUMENTS

| 715,393 | 12/1902 | Koehler | 356/240 |
| 1,763,109 | 6/1930 | Strobl | 356/239 |
| 3,350,920 | 11/1967 | Brauer | 73/49.1 |
| 3,980,890 | 9/1976 | Heckrodt et al. | 356/239 |

Primary Examiner—Vincent P. McGraw
Attorney, Agent, or Firm—Powell L. Sprunger

[57] ABSTRACT

A device for testing an elongated elastic sleeve or balloon. The device has a pair of clamp members which selectively grip opposed ends of the sleeve, and the device inflates the sleeve while retained by the clamp members. The device illuminates the inflated sleeve walls from the inside of the sleeve to permit visual inspection of the sleeve walls. The device also permits rotation of the clamp members and retained sleeve to permit visual inspection of the inflated sleeve walls circumferentially around the sleeve. The device permits submersion of the inflated sleeve into a testing liquid in order to determine whether the sleeve walls leak.

1 Claim, 11 Drawing Figures

BALLOON TESTING DEVICE

This is a division of application Ser. No. 920,105 filed June 28, 1978, now U.S. Pat. No. 4,212,192.

BACKGROUND OF THE INVENTION

The present invention relates to testing devices, and more particularly to devices for testing an elongated elastic sleeve or balloon.

A various assortment of catheters have been proposed in the past for use in patients. Many of such catheters, for example Foley catheters and endotracheal tubes, are constructed with an inflatable sleeve or balloon on a shaft to permit retention or sealing by the balloon in the patient's body. For example, Foley catheters are normally constructed having an elongated hollow shaft defining a drainage lumen, an inflatable sleeve secured on a distal end of the shaft, and a drainage eye adjacent the distal end of the shaft communicating with the drainage lumen. The catheter shaft is passed through the patient's urethra until the drainage eye and inflatable sleeve are located in the bladder, and a drainage tube is connected to a proximal end of the catheter shaft which is located outside the patient's body. The sleeve is inflated through a sidearm and inflation lumen of the catheter in order to expand the balloon in the patient's bladder, and retain the catheter in place. During catheterization, urine drains from the bladder through the drainage eye, the drainage lumen, and the drainage tube to a collection bag for retention therein.

The inflatable balloons or sleeves are normally constructed from a relatively thin elastic material, such as silicone, which may be formed by extrusion. It is not uncommon that the sleeves may contain imperfections, such as areas of weakness or pin holes, which deleteriously affect operation of the catheter balloon during use. For example, if the catheter balloon contains one or more pin holes, the balloon may deflate in the patient's body, thus rendering the catheter balloon useless. In some instances, the defective balloon may be undetected by the physician, and may result in possible harm to the patient. Thus, it is necessary to assure that the catheter balloon is in an acceptable condition before supplying the catheter to the physician.

In the past, catheter balloons have been tested pursuant to manufacture by individually inflating each of the balloons after securement onto the catheter shaft. It will be apparent that this procedure is both time consuming and tedious, and necessarily adds to the manufacturing cost of the catheter. Moreover, such tests merely ascertain that the balloon may be inflated, and may not reveal more serious defects in the balloon which are not apparent during inflation. For example, the balloon may have an area of weakness which may rupture during use, particularly when stresses are applied to the inflated balloon, or the balloon may have one or more relatively small pin holes which leak slowly during an extended period of time. Further, even if a defect in the balloon is discovered by this procedure, the balloon has been previously secured onto the catheter shaft, and the entire catheter must be discarded due to the faulty balloon, thus unnecessarily resulting in waste and additional cost to the manufacturing procedures.

SUMMARY OF THE INVENTION

A principal feature of the present invention is the provision of a device for testing an elongated elastic sleeve.

The device of the present invention comprises, an elongated inflation member to receive one end of the sleeve, with the inflation member having an orifice communicating with the inside of the sleeve when the sleeve is placed on the inflation member and having a passageway communicating with the orifice. The device has a first clamp member having a pair of opposed movable jaws on opposed sides of the inflation member. The device has means for selectively moving the jaws of the first clamp member between a first open position with the jaws spaced from the inflation member, and a second closed position with the jaws gripping the sleeve against the inflation member. The device has an elongated illumination member to receive the other end of the sleeve, and a second clamp member having a pair of opposed movable jaws on opposed sides of the illumination member. The device has second means for selectively moving the jaws of the second clamp member between a first open position with the jaws spaced from the illumination member, and a second closed position with the jaws gripping the sleeve against the illumination member.

A feature of the invention is that the operator may place one end of the sleeve over the inflation member and then initiate operation of the device.

Another feature of the invention is that the device assures that the operator's hands are removed from the movable portion of the apparatus for safety purposes.

Still another feature of the invention is that after initiation of the device, the first clamp member automatically closes and grips the one end of the sleeve against the inflation member.

Yet another feature of the invention is that the device automatically advances the illumination member into the other end of the sleeve, and then closes the second clamp member against the other sleeve end over the illumination member.

A further feature of the invention is that the device then automatically inflates the retained sleeve with a predetermined amount of air.

Yet another feature of the invention is the provision of means for modifying the amount of predetermined air which is utilized to inflate the sleeve.

Still another feature of the invention is that a source of light is connected to the illumination member, such that the illumination member illuminates the walls of the inflated sleeve from the inside of the sleeve.

Thus, a feature of the invention is that the sleeve walls are automatically illuminated from the inside in order to permit clear visual inspection of the sleeve walls while expanded.

Yet another feature of the invention is that the inflated sleeve may be rotated while being illuminated to visually inspect the sleeve walls circumferentially around the sleeve.

Still another feature of the invention is that the inflated sleeve may be submerged into a testing liquid in order to determine whether air passes through the walls of the inflated sleeve as indicated by rising air bubbles in the liquid.

A feature of the invention is that the operator may signal the apparatus after testing has been completed, and the device automatically releases the tested sleeve from the first and second clamp members after which the operator may retain or discard the sleeve depending upon the testing results.

Yet another feature of the invention is the provision of means for maintaining a total count of acceptable and defective sleeves over a period of prolonged testing of numerous sleeves by an operator.

Thus, a feature of the present invention is that the sleeves may be tested in a simplified and efficient manner.

A further feature of the invention is that the testing device ascertains imperfections in the sleeve which would otherwise be undetected.

Yet another feature of the invention is that the device permits testing of the sleeves prior to securement onto a catheter shaft, and eliminates the waste associated with disposal of entire catheters having defective balloons.

A further feature of the invention is that the device reduces the effective manufacturing cost of the catheters.

Still another feature of the invention is that the device minimizes the possibility that a catheter having a defective balloon may be supplied to the physician for use.

Further features will become more fully apparent in the following description of the embodiments of this invention and from the appended claims.

DESCRIPTION OF THE PREFERRED EMBODIMENTS

Figure 1:
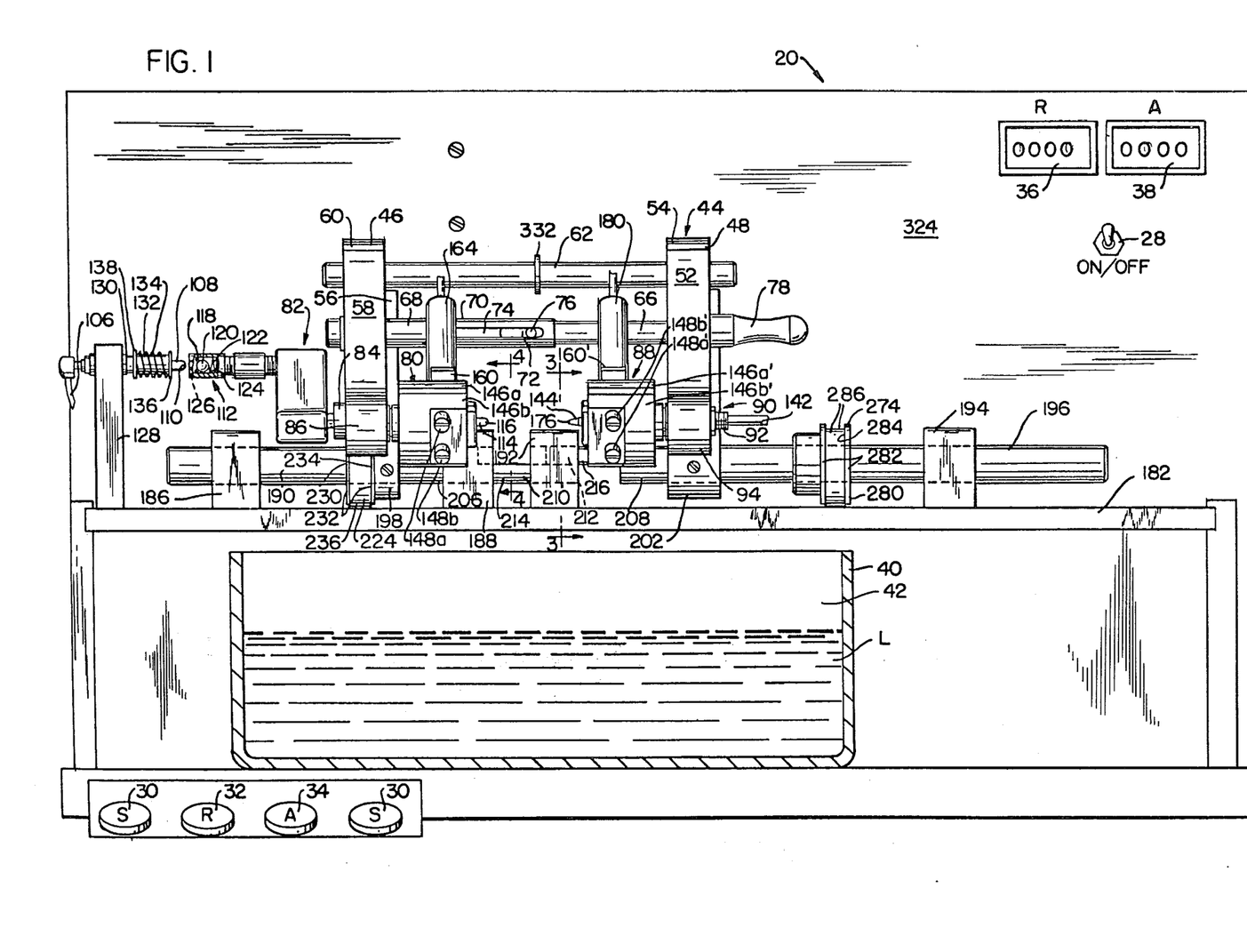
FIG. 1 is a fragmentary front elevational view, taken partly in section, of a balloon testing apparatus of the present invention.
Figures 3, 7, 9, 10:
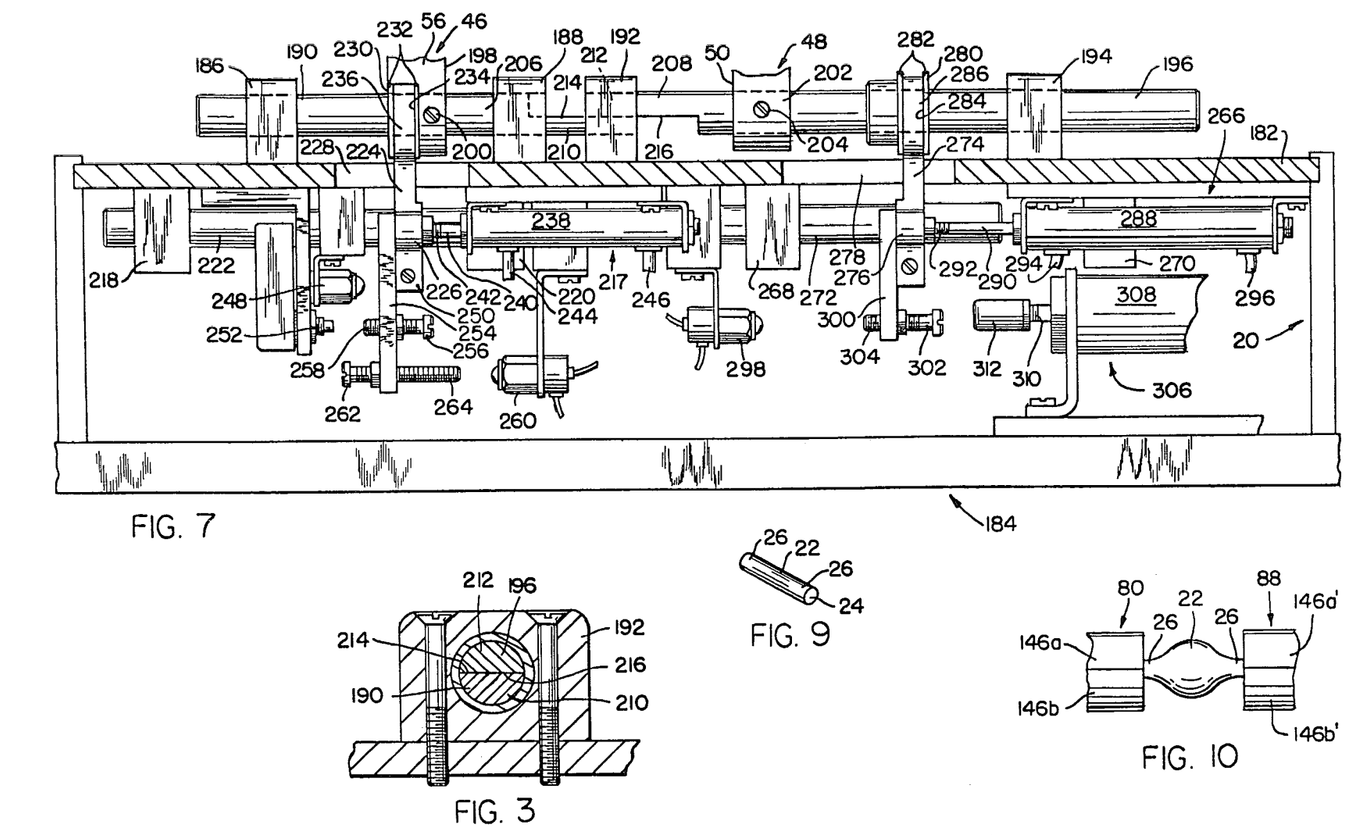
FIG. 3 is a sectional view taken substantially as indicated along the line 3—3 of FIG. 1.
FIG. 7 is a fragmentary elevational view, taken partly in section, of driving mechanism for the apparatus of FIG. 1.
FIG. 9 is a perspective view of a typical inflatable balloon which may be tested by the apparatus of the present invention.
FIG. 10 is a diagrammatic view illustrating the balloon of FIG. 9 in an inflated configuration during testing.

With reference to FIG. 1, there is shown an apparatus generally designated 20 for testing an inflatable balloon. As shown in FIG. 9, the balloon comprises an annular sleeve 22 defining a channel 24, and having a pair of opposed ends 26. Typically, such a balloon or sleeve 22 may be extruded from a suitable material, such as silicone. The balloon may be constructed of desired diameter, length, and thickness for use on any suitable catheter, such as a Foley catheter or an endotracheal tube. The opposed ends 26 of the sleeve 22 are secured onto a catheter shaft during manufacture of the catheter, such that the sleeve 22 defines a cavity between the sleeve and the shaft. During use, the sleeve is inflated through a lumen which communicates with the cavity beneath the sleeve. In the case of a Foley catheter, the sleeve is inflated in the patient's bladder in order to retain the catheter in proper position once it has been placed. It is not uncommon that the sleeves may contain imperfections, such as regions of weakness or pin holes, subsequent to formation. Although the balloon may be inflated for testing purposes after it has been secured to the catheter shaft, the entire catheter must be discarded if the balloon should prove defective. Accordingly, it is desirable to test the balloon prior to securement onto the catheter shaft. As will be described below, the apparatus of the present invention accomplishes this result in an efficient and simplified manner while greatly enhancing the detection of defective balloons.

With reference to FIG. 1, the apparatus 20 has a power switch 28, and a plurality of control switches, such as a pair of spaced switches 30 labelled "Start", a switch 32 labelled "Reject", and a switch 34 labelled "Accept". The apparatus 20 may also have a pair of digital counters 36 and 38, with the counter 36 being associated with the reject switch 32 and being labelled "Reject", and with the switch 38 being associated with the accept switch 34 and being labelled "Accept ". The operation of the above switches and counters in association with the control system for the apparatus will be described in detail below. As shown, the apparatus 20 may also have a suitable tray 40 defining a cavity 42 to receive a testing liquid L.

Figure 2:
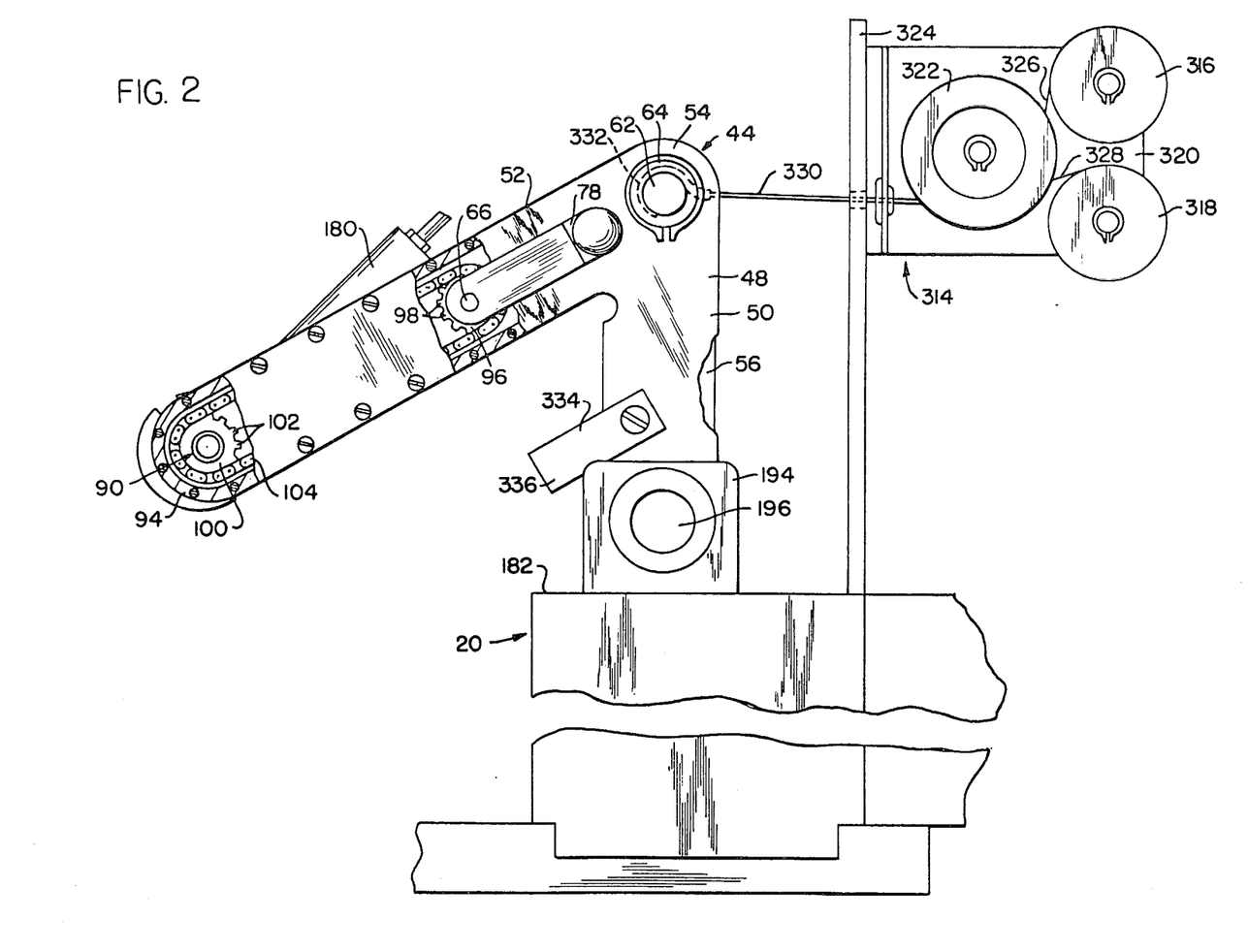
FIG. 2 is a fragmentary end elevational view, partly broken away, of the balloon testing apparatus of the present invention.

With reference to FIGS. 1 and 2, the apparatus 20 has a test assembly generally designated 44 having a pair of spaced and generally aligned first and second support members 46 and 48. The second support member 48 has an upright arm 50, and a hollow support arm 52 extending forwardly from an upper end 54 of the arm 50, and being inclined downwardly from the upper end 54 at an acute angle relative to the upright arm 50. The first support member 46 is aligned with the second support member 48 and has a configuration very similar to the second support member 48. Thus, the first support member 46 has an upright arm 56, and a forwardly projecting hollow support arm 58 extending at an acute angle from an upper end 60 of the arm 56 in a manner as previously described in connection with the second support member 48. As viewed in FIG. 2, the upright arms 50 and 56 and the support arms 52 and 58 of the support members 48 and 46, respectively, are aligned with each other along the length of the test assembly 44. The desired alignment between the support members 46 and 48 is permanently maintained by an elongated shaft 62 which is received in the upper ends 54 and 60 of the respective support members 48 and 46. The shaft 62 may be fixedly mounted in the upper end 60 of the first support member 46, while the shaft 62 is slidably received in a suitable bearing 64 mounted in the upper end 54 of the second support member 48 in order to permit modification of the spacing between the first and second support members 46 and 48.

As shown in FIGS. 1 and 2, the test assembly 44 has an elongated crank shaft 66 which is rotatably mounted by suitable bearings in the opposed walls of the support arm 52 associated with the second support member 48. Similarly, the test assembly 44 has an elongated crank member 68 which is rotatably mounted by suitable bearings in the opposed walls of the support arm 58 associated with the first support member 46. As shown, the crank member 68 has an elongated hollow sleeve 70 which is directed toward the crank shaft 66, with an outer end 72 of the shaft 66 being slidably received in the crank member sleeve 70. The sleeve 70 has an elongated slot 74 which receives an outwardly directed pin 76 on the outer end 72 of the crank shaft 66. A handle or crank member 78 is attached to the opposed end of the shaft 66, such that the operator may impart rotational movement to the crank shaft 66. In turn, the pin 76 on the shaft 66 engages against the wall of the sleeve 70 defining the slot 74 in order that rotational movement of the shaft 66 is translated to the sleeve 70 and the crank member 68 in the first support member 46. Further, the shaft pin 76 may move longitudinally in the sleeve slot 74 while the shaft 66 slides in the sleeve 70 in order that the relative spacing between the first and second support members 46 and 48 may be modified.

The test assembly 44 has an inflation clamp member 80 which is mounted on an air connection member 82 having a central portion 84 which extends through and which is rotatably mounted in a lower end 86 of the support arm 58 associated with the first support member 46. In this regard, rotational movement of the air connection member 82 in the support arm 58 is imparted to rotational movement of the inflation clamp member 80 about a central axis. The test assembly 44 also has an illumination clamp member 88 which is mounted on a light transmitting member 90. A central portion 92 of the transmitting member 90 is rotatably mounted in a lower end 94 of the support arm 52 associated with the second support member 48, such that rotational movement of the light transmitting member 90 is imparted to rotational movement of the clamp member 88.

With reference to FIGS. 1 and 2, the crankshaft 66 has a sprocket 96 with suitable teeth 98 positioned within the support arm 52 associated with the second support member 48. Also, the transmitting member 90 has a sprocket 100 with suitable teeth 102 positioned within the lower end 94 of the support arm 52. As shown, the second support member 48 also has a suitable endless chain or belt 104 passing around the sprockets 96 and 100, with the associated teeth 98 and 102 being received in the chain 104. In addition, the crank member 68 has a suitable sprocket with teeth positioned in the support arm 58 associated with the first support member 46, while the connection member 82 has a suitable sprocket with teeth positioned within the lower end 86 of the support arm 58, with an endless chain passing around the sprockets associated with the crank member 68 and the connection member 82. It will be appreciated that the sprocket and chain assembly in the support arm 58 associated with the first support member 46 is virtually identical to the sprocket and chain assembly in the support arm 52 associated with the second support member 48.

Thus, when the handle 78 is turned by the operator, rotation of the crank shaft 66 is translated through the chain 104 to rotational movement of the light transmitting member 90 and the associated illumination clamp member 88. In addition, as previously discussed, rotation of the crank shaft 66 is imparted to the crank member 68 through the cooperating pin 76 and slot 74 associated respectively with the crank shaft 66 and the crank member 68. In turn, rotation of the crank member 68 is imparted through the chain in the support arm 58 to the air connection member 82 and associated inflation clamp member 80. Accordingly, the described apparatus translates rotational movement of the handle 78 to simultaneous rotation of the inflation clamp member 80 and the illumination clamp member 88, with the device being constructed such that the clamp members 80 and 88 rotate the same angle relative each other responsive to a given rotation of the handle 78 and shaft 66. In this manner, the operator may readily rotate the clamp members 80 and 88 through use of the handle 78 for a purpose which will be described below.

With reference to FIG. 1, the apparatus 20 has an air supply line 106 which communicates through a suitable passageway to an actuating nozzle 108 having an orifice 110. Further, the air connection member 82 has a suitable passageway extending between a valve assembly 112 at one end of the connection member 82 through the connection member 82 to an inflation nozzle 114 which projects from a central portion of the clamp member 80 at the other end of the connection member 82, with the nozzle 114 having a passageway communicating with an orifice 116 at the outer end of the nozzle 114. The valve assembly 112 has an elastic O-ring 118 defining a seat, and a ball 120 which is biased by a helical spring 122 against the O-ring 118 in a chamber 124 of the valve assembly 112. The valve chamber 124 communicates through the passageway with the inflation nozzle 114, and the valve assembly 112 is normally closed, such that the end of the passageway associated with the valve assembly 112 is normally closed from the atmosphere. In a normal configuration of the connection member 82, the valve assembly 112 is aligned with and slightly spaced from the actuation nozzle 108. In this configuration, the device permits rotational movement of the connection member 82 and the clamp member 80 in the support arm 58 without obstruction between the valve assembly 112 and the actuation nozzle 108.

As will be further discussed below, the first support member 46 may be moved by the apparatus in a direction toward the left, as viewed in FIG. 1, such that the connection member 82 and the valve assembly 112 are advanced toward the actuation nozzle 108 until the nozzle 108 contacts the ball 120 through an opening 126 in the valve assembly 112, such that the nozzle 108 moves the ball 120 away from the O-ring 118 and opens the valve assembly 112 while the O-ring sealingly engages against the outside of the nozzle 108. The apparatus has an arm 128 supporting a hollow sleeve 130 which slidably receives a conduit member 132 defining a passageway between the supply line 106 and the nozzle 108 which projects outwardly from the conduit member 132. As shown, a helical spring 134 extends around a portion of the conduit member 132 and biases a flange 136 of the conduit member 132 away from a flange 138 on the sleeve 130. In this manner, the conduit member 132 is biased by the spring 134 in a direction toward the valve assembly 112, such that the conduit member 132 is permitted to yield and slide in the sleeve 130 when struck by the valve assembly 112 on the connection member 82. At the same time, the nozzle 108 on the conduit member 132 opens the valve assembly 112 in order to establish communication between the passageway in the conduit member 132 and the passageway in the connection member 82. As will be further discussed below, a predetermined amount of air is then passed from the supply line 106 through the passageway in the conduit member 132, the valve assembly 112, the passageway in the connection member 82, and the nozzle 114 into the elastic sleeve which is retained on the clamps 80 and 88 in order to inflate the sleeve. After the predetermined amount of air has been utilized to inflate the sleeve, the apparatus moves the first support member 46 in a direction towards the right, as viewed in FIG. 1, in order to withdraw the actuation nozzle 108 from the valve assembly 112. Thus, the valve assembly 112 closes at this time in order to maintain the balloon in an inflated condition for purposes of testing. Further, in this configuration, the valve assembly 112 is spaced from the actuation nozzle 108 to prevent obstruction between the nozzle 108 and the valve assembly 112 during rotation of the connection member 82 as will be further described below.

Figure 8:
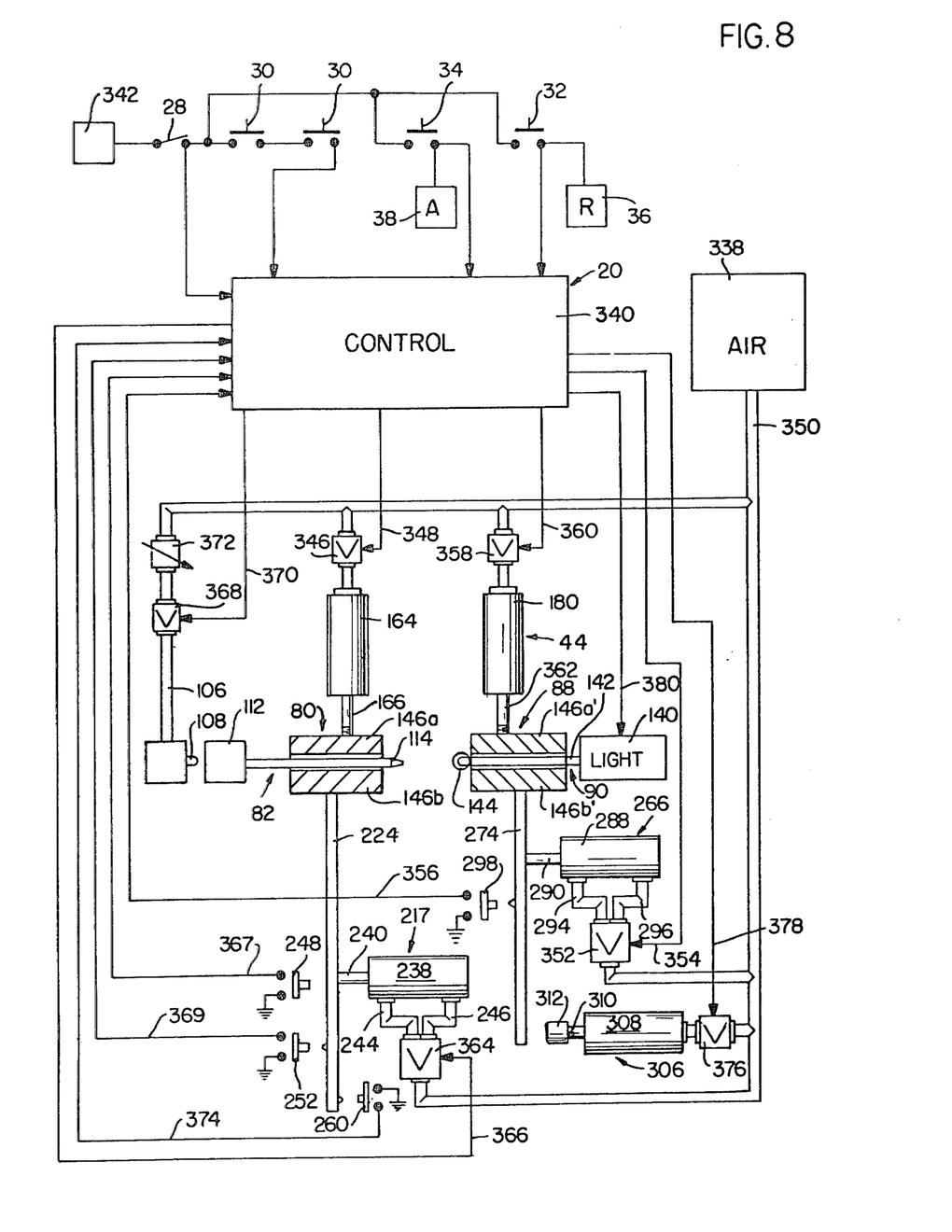
FIG. 8 is a diagrammatic view of the balloon testing apparatus of the present invention.

With reference to FIG. 1 and 8, the apparatus 20 has a suitable light source 140 which is connected to an elongated flexible light transmitting conduit 142 in the transmitting member 90. In turn, the conduit 142 extends through the lower end 94 of the support arm 52 and through a central portion of the clamp member 88, with the transmitting conduit 142 being connected to an elongated illumination member 144 which projects from the clamp member 88. The light transmitting conduit 142 may comprise a suitable bundle of fiber optics strands, such as a suitable glass or lucite. The illumination member 144 may be constructed from a durable material, e.g., a polycarbonate material sold under the trademark Lexan by the General Electric Company. Thus, the device transmits light from the light source 140 through the conduit 142 to the illumination member 144 in order to illuminate the inflated balloon by the illumination member 144 from the inside through the walls of the balloon.

Figures 4, 5:
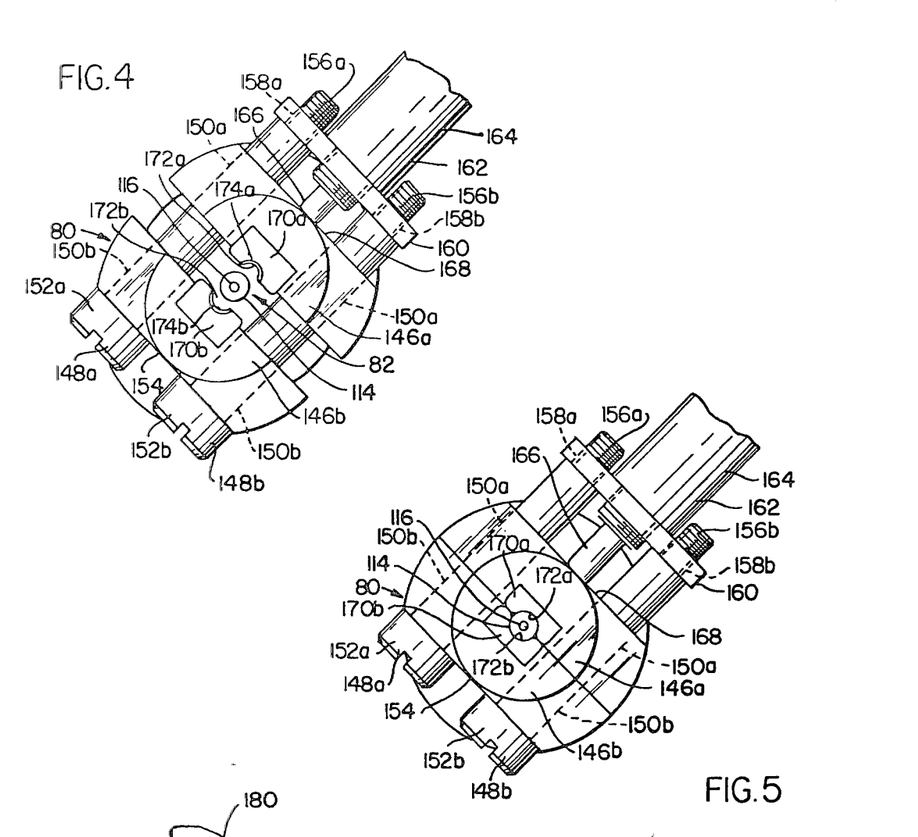
FIG. 4 is a fragmentary end view of an inflation clamp member in an open configuration taken substantially as indicated along the line 4—4 of FIG. 1.
FIG. 5 is a fragmentary end view of the clamp member of FIG. 4 illustrating the clamp member in a closed configuration.

With reference to FIGS. 1 and 4, the inflation clamp member 80 has a pair of opposed jaws 146a and 146b which are slidably received on a pair of spaced bolts 148a and 148b which pass through suitable pairs of spaced bores 150a and 150b extending through the respective jaws 146a and b. The bolts 148a and b have associated heads 152a and 152b which engage against a lower surface 154 of the lower jaw 146b. The other threaded ends 156a and 156b of the bolts 148a and b are received in suitable threaded apertures 158a and 158b in a plate 160 which is connected to a lower end 162 of an air cylinder 164. As shown, the cylinder 164 has a piston 166 which projects from the cylinder 164 and engages against an upper surface 168 of the upper jaw 146a. The clamp member 80 has a pair of internal springs which biases the lower jaw 146b towards the respective heads 152a and b of the bolts 148a and b, and which biases the upper jaw 146a towards the plate 160 and against the cylinder piston 166.

As previously discussed, the connection member 82 extends through the clamp member 80 intermediate the opposed jaws 146a and b with the inflation nozzle 114 projecting from the jaws, as shown in FIG. 1. With reference to FIG. 4, the jaws 146a and b have opposed elastic retaining members 170a and 170b which may be made from a suitable material, such as rubber. As shown, the retaining members 170a and b have associated recesses 172a and 172b which face towards the inflation nozzle 114, such that the retaining members 170a and b engage against the inflation nozzle 114 around the recesses 172a and b when the clamp member 80 is closed. Further, the retaining members 170a and b have slightly raised semi-annular gripping portions 174a and 174b which are snugly received within an annular recess of the inflation nozzle 114 when the clamp member 80 is closed. The annular recess of the inflation nozzle 114 is virtually identical to the recess which will be described below in connection with the illumination member 144 associated with the clamp member 88.

With reference to FIGS. 1 and 5, when the cylinder 164 is actuated, the piston 166 extends from the cylinder 164 and bears against the upper surface 168 of the upper jaw 146a. In turn, the plate 160 is moved away from the upper jaw 146a, such that the plate 160 moves the bolts 148a and b through the jaws 146a and b while the bolt heads 152a and b engage against the lower surface 154 of the lower jaw 146b. Thus, the piston 166 and bolts 148a and b cooperate to bring the jaws 146a and b into a closure position while the retaining members 170a and b snugly engage against the inflation nozzle 114. When the piston 166 subsequently retracts into the cylinder 164, the springs in the clamp member 80 bias the jaws 146a and b from the closure position illustrated in FIG. 5 to the open position illustrated in FIGS. 1 and 4. As will be further described below, one end of the elastic sleeve is placed over the inflation nozzle 114 with the clamp member 80 open preparatory to testing, and the device then actuates the cylinder 164 to extend the piston 166 and close the jaws 146a and b, such that the respective retaining members 170a and b grip the sleeve in sealing engagement about the inflation nozzle 114. After the other end of the sleeve has been suitably engaged by the jaws of the other clamp member 88 in sealing engagement, air is passed through the inflation nozzle 114 into the sleeve in order to inflate the balloon and permit testing.

Figure 6:
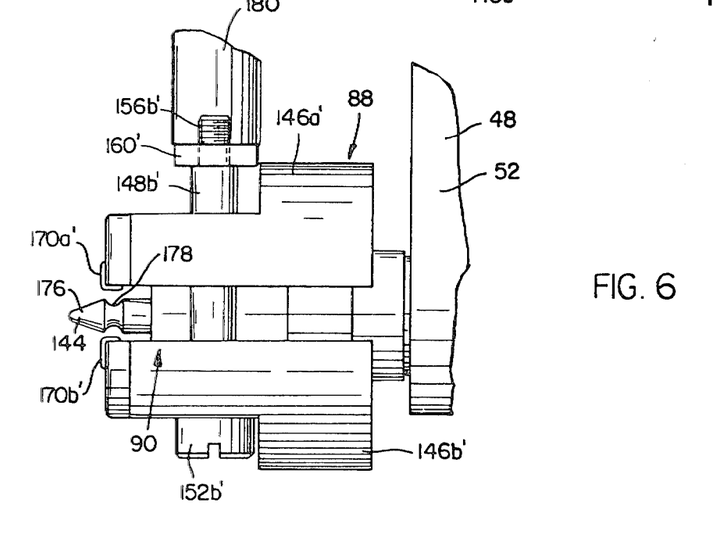
FIG. 6 is a fragmentary end view of an illumination clamp member of the apparatus of FIG. 1 illustrating the clamp member in an open configuration.

The illumination clamp member 88 illustrated in FIG. 1 is shown in greater detail in FIG. 6. As will be apparent, the structure of the clamp member 88 is very similar to the structure of the clamp member 80, and, for convenience, reference numerals associated with parts of the clamp 88 which are similar to the parts previously discussed for the clamp member 80 will be utilized with the addition of a prime ('). Thus, with reference to FIGS. 1 and 6, the clamp member 88 has a pair of opposed jaws 146a' and 146b' which are slidably received on a pair of bolts 148a' and 148b', and which are biased outwardly by springs to an open position of the jaws 146a' and 146b' and the clamp member 88. The jaws 146a' and 146b' have associated elastic retaining members 170a' and 170b' which face toward the illumination member 144 of the light transmitting member 90 which extends through the clamp member 88 intermediate the jaws 146a' and 146b'. As shown, the illumination member 144 has a tapered outer end 176 to spread light within the inflated sleeve, and an annular recess 178 which is aligned with the opposed elastic retaining members 170a' and 170b'. The retaining members 170a' and 170b' have associated semi-annular recesses and enlarged gripping portions which face toward the recess 178 of the illumination member 144, with the retaining member gripping portions being received in the recess 178 when the clamp member 88 closes. Thus, the structure is similar to the arrangement previously discussed in connection with the clamp member 80 with associated jaws and retaining members. As previously indicated, the inflation nozzle 114 of the clamp member 80 has an annular recess similar to the recess 178 associated with the illumination member 144 in order to receive the gripping portions of the jaw retaining members.

With further reference to FIG. 6, the clamp member 88 has an air cylinder 180 associated with the jaws 146a' and 146b', with the cylinder 180 having a piston which may be extended to bear against the upper jaw and close the jaws of the clamp 88 in a manner as previously discussed in connection with the clamp member 80. Thus, during operation of the device, an end of the elastic sleeve is received over the illumination member 144 intermediate the open jaws 146a' and 146b', after which the jaws are closed by the cylinder 180 while the retaining members 170a' and 170b' sealingly engage the balloon end against the illumination member 144 in a closure position of the clamp member 88. After both the clamp members 80 and 88 have been closed about the sleeve, air is passed through the inflation nozzle 114 associated with the clamp member 80 in order to inflate the balloon and permit testing of the balloon. In addition, at this time, light is transmitted by the transmitting member 90 from the light source to the illumination member 144 within the inflated balloon in order to illuminate the balloon from the inside through the walls of the inflated balloon.

With reference to FIGS. 1 and 7, the apparatus 20 has a base plate 182 which separates the test assembly 44 from a drive assembly 184 which is mounted beneath the plate 182. The apparatus 20 has a pair of spaced bearings 186 and 188 mounted on the base plate 182, and supporting a first shaft 190 which is associated with the first support member 46, with the shaft 190 being slidably and rotatably received in the associated bearings 186 and 188. The apparatus 20 has a pair of additional bearings 192 and 194 mounted on the plate 182 and supporting a second shaft 196 associated with the second support member 48, with the second shaft 196 being slidably and rotatably received within the bearings 192 and 194. As shown, a lower end 198 of the upright arm 56 associated with the first support member 46 is fixedly attached to the first shaft 190 intermediate the bearings 186 and 188 by suitable means, such as a screw 200. Similarly, a lower end 202 of the upright arm 50 associated with the second support member 48 is fixedly attached to the second shaft 196 intermediate the bearings 192 and 194 by suitable means, such as a screw 204.

With reference to FIGS. 1, 3, and 7, the first and second shafts 190 and 196 have a pair of adjacent ends 206 and 208, respectively, defining a pair of overlapping semi-cylindrical tongues 210 and 212, with the tongues 210 and 212 defining respective planar surfaces 214 and 216 which face each other intermediate the tongues 210 and 212. As will be apparent, the tongues 210 and 212 of the associated first and second shafts 190 and 196 permit sliding movement of the shafts 190 and 196 relative to each other through the associated bearings. In addition, the tongues 210 and 212 of the respective shafts 190 and 196 cooperate to impart rotational movement from either of the shafts 190 or 196 to the other shaft 190 or 196, such that the shafts rotate together as a unit, although the shafts 190 and 196 may independently undertake relative longitudinal sliding movement through the associated bearings.

Since the lower end 198 of the arm 56 associated with the first support member 46 is attached to the shaft 190, while the lower end 202 of the arm 50 associated with the second support member 48 is secured to the second shaft 196, both the first and second support members 46 and 48 are permitted to rotate as a unit about the longitudinal axis of the first and second shafts 190 and 196. In this regard, it has been previously noted that the shaft 62 maintains the first and second support members 46 and 48 in an aligned configuration, such that the shaft 62 adds stability to the test assembly 44 as the first and second support members 46 and 48 rotate together with the first and second shafts 190 and 196 in the respective bearings. In addition, since the first and second shafts 190 and 196 are slidably received in the associated bearings, and since the tongues 210 and 212 permit sliding movement of the shafts relative to each other, it will be apparent that the apparatus permits relative longitudinal movement of the first and second support members 46 and 48 toward and away from each other. In this regard, it has previously been noted that the shaft 62 is slidably received in the second support member 48, while the crank shaft 66 is slidably received in the crank member 68 to permit movement of the support members 46 and 48 relative to each other. Of course, the clamp members 80 and 88 move toward and away from each other responsive to longitudinal movement of the associated first and second support members 46 and 48.

With reference to FIGS. 1 and 7, the apparatus 20 has a drive assembly 217 for the first support member 46 having a pair of spaced bearings 218 and 220 which depend from the base plate 182 and which support and slidably receive a third shaft 222. The drive assembly 217 also has a drive shaft 224 having a lower end 226 fixedly secured to the third shaft 222. As shown, the drive shaft 224 projects upwardly from the third shaft 222 through an elongated slot 228 in the base plate 182. The first shaft 190 has a pulley member 230 fixedly secured to the shaft 190 and having a pair of spaced annular flanges 232 defining an annular groove 234. The drive shaft 224 has a forked upper end 236 defining a pair of spaced tines which are received in the groove 234 on opposed sides of the pulley member 230, such that the pulley member 230 is permitted to rotate within the tines of the drive shaft 224 while the pulley member 230 maintains the drive shaft 224 in an upright position. The drive apparatus 217 also has a cylinder 238 which is mounted below the base plate 182, with the cylinder 238 having a piston 240 which has its outer end 242 secured to the drive shaft 224. The cylinder 238 has a pair of air supply lines 244 and 246 which control operation of the cylinder 238. Thus, when the piston 240 extends and retracts relative to the cylinder 238, motion of the piston 240 is translated through the drive shaft 224 to the pulley member 230 on the first shaft 190. Since the pulley member 230 is fixedly secured to the shaft 190, the piston motion of cylinder 238 is further translated to the first shaft 190 and the first support member 46 of the test assembly 44 which is fixedly secured to the shaft 190. Accordingly, the cylinder 238 is utilized to drive the first support member 46 and associated clamp member 80 in a longitudinal direction relative to the base plate 182. As previously indicated, the drive shaft 224 associated with the cylinder 238 does not impede rotational movement of the first shaft 190 and the first support member 46 of the test assembly 44.

The drive assembly 217 has a first control switch 248 which is mounted beneath the base plate 182 in a suitable manner. The lower end 226 of the drive shaft 224 has a lower plate 250 which contacts the switch 248 in an extended configuration of the piston 240 associated with the cylinder 238. The drive assembly 217 also has a second control switch 252 which is mounted in a suitable manner beneath the base plate 182. As shown, the drive shaft 224 has a depending control plate 254 having a threaded bolt 256 received in a threaded aperture in the plate 254 and aligned with the switch 252. Thus, a forward end 258 of the bolt 256 which projects through the plate 254 contacts the switch 252 in an extended configuration of the cylinder piston 240. Of course, the bolt 256 may be adjusted in the plate 254 to obtain closure of the switch 252 at a desired extended position of the piston 240. The drive assembly 217 also has a third control switch 260 which may be mounted in a suitable manner beneath the base plate 182. As shown, the assembly 217 has a threaded bolt 262 which extends through a threaded aperture in the control plate 254 with the bolt 262 being aligned with the switch 260, such that an outer end 264 of the bolt 262 contacts and actuates the switch 260 in a retracted position of the piston 240 within the cylinder 238. The position of the bolt 262 may be adjusted in the plate 254 in order to select the retracted position of the piston 240 at which the third switch 260 actuates. Thus, the cylinder 238 of the drive assembly 217 is utilized to move the first support member 46 of the test assembly 44, while the control switches 248, 252, and 260 determine extended and retracted positions of the piston 240 in the cylinder 238 for purposes of control.

The apparatus 20 also has a drive assembly generally designated 266 for controlling movement of the second support member 48 of the test assembly 44. The drive assembly 266 has a pair of spaced bearings 268 and 270 depending from the base plate 182 and slidably receiving a fourth shaft 272 beneath the plate 182. The drive assembly 266 has a drive shaft 274 having a lower end 276 fixedly secured to the fourth shaft 272, with the drive shaft 274 projecting upwardly through elongated slot 278 in the base plate 182. The second shaft 196 has a pulley member 280 fixedly secured to the shaft 196, and having a pair of spaced annular flanges 282 defining an annular groove 284 intermediate the flanges 282. The drive shaft 274 has a forked upper end 286 defining a pair of spaced tines which are received in the groove 284 on opposed sides of the pulley member 280, such that the pulley member 280 is permitted to rotate between the tines of the drive shaft 274 while the pulley member 280 maintains the drive shaft 274 in an upright position. Thus, the drive shaft 274 carries the pulley member 280 and associated second shaft 196, although the pulley member 280 and shaft 196 are permitted to rotate in the associated bearings such that the drive shaft 274 does not impede rotational movement of the second support member 48 of the test assembly 44.

The drive assembly 266 has a cylinder 288 which is mounted in a suitable manner beneath the base plate 182. As shown, the cylinder 288 has an extensible piston 290 having an outer end 292 secured to a lower end 276 of the drive shaft 274. The cylinder 288 has a pair of air supply lines 294 and 296 which are utilized to control the cylinder 288 and movement of the associated piston 290. Thus, longitudinal motion of the piston 290 relative to the cylinder 288 is translated through the drive shaft 274 to the pulley member 280 and the second shaft 196, since the pulley member 280 is fixedly secured to the shaft 196. In turn, longitudinal motion of the second shaft 196 is translated through the upper arm 50, which is secured to the shaft 196, to the second support member 48 and the associated clamp member 88 of the test assembly 44. In this manner, the cylinder 288 is utilized to move the second support member 48 of the test assembly 44 in a longitudinal direction along the base plate 182 and relative to the first support member 46 of the test assembly 44.

The drive assembly 266 has a fourth control switch 298 which may be mounted in a suitable manner beneath the base plate 182. The drive assembly 266 also has a control plate 300 which is secured to and depends from the drive shaft 274. As shown, a threaded bolt 302 is received in a suitable threaded aperture in the plate 300 at a position aligned with the control switch 298. A forward end 304 of the bolt 302 contacts and actuates the switch 298 in an extended position of the cylinder piston 290. Thus, the cylinder 288 of the drive assembly 266 is utilized to move the second support member 48 of the test assembly 44 relative to the first support member 46 while the switch 298 is utilized to control the drive assembly 266.

The apparatus 20 also has a limit assembly generally designated 306 associated with the drive assembly 266. The limit assembly 306 comprises a cylinder 308 which may be mounted in a suitable manner beneath the base plate 182. The cylinder 308 has a piston 310 which may be extended from the cylinder 308, with the piston 310 having an abutment member 312 secured to an outer end of the piston 310. The abutment member 312 is positioned to strike the control plate 300 of the drive shaft 274 at a position behind the bolt 302. During operation of the device, the cylinder 308 is operated by a suitable air supply line to extend the piston 310 and position the abutment member 312 to stop rearward movement of the control plate 300 and the piston 290 as the piston 290 retracts within the cylinder 288 of the drive assembly 266. Thus, the cylinder 308 effectively operates to limit motion of the second support member 48 in a right hand direction along the base plate, as viewed in FIG. 1.

Referring now to FIGS. 1 and 2, the apparatus 20 has a contant tension control device or negator motor generally designated 314, such as a device model No. ML-2921 sold by Ametek/Hunter Spring, Hatfield, Pennsylvania, which acts as a counterbalance during rotational movement of the test assembly 44. The tension control device 314 comprises a pair of spools 316 and 318 which are rotatably mounted on a plate 320 behind the spools. As shown, the apparatus 20 has an upright plate 324 positioned behind the test assembly 44, with the plate 320 of the control device 314 being mounted on the rear side of plate 324 which is interposed between the control device 314 and the test assembly 44. The control device 314 also has a control spool 322 which is rotatably mounted on the plate 320 intermediate the spools 316 and 318 and the upright plate 324. The spools 316 and 318 have elongated strips 326 and 328 of a suitable metallic material which are separately wound about the spools 316 and 318, and which are wound together about the spool 322. The control device 314 also has a wire or cord 330 having one end wound about the control spool 322, with the cord 330 extending through suitable openings in the control device 314 and plate 324 to the test assembly 44, where an outer end of the cord 330 is attached to the shaft 62 by a suitable hook 332.

The control device 314 operates in association with the test assembly 44 as follows. The control device 314 applies force against the cord 330 in order to maintain the first and second support members 46 and 48 of the test assembly 44 in a normal upright configuration, as illustrated in FIGS. 1 and 2. However, when it is decided to rotate the test assembly 44 as a unit in a forward direction as viewed in FIG. 1, and in a counterclockwise direction as viewed in FIG. 2, the control device 314 applies a constant force against the cord 330 and the test assembly 44 during rotation of the test assembly 44 due to cooperation of the metallic strips 326 and 328 and the control device spools. Thus, the control device 314 prevents the test assembly 44 from falling from its normal upright position, and permits rotational movement of the test assembly 44 about the rotational axes of the first and second shafts 190 and 196 while the operator moves the test assembly under uniform tension supplied by the cord 330.

Accordingly, after the balloon has been suitably inflated in the clamp members 80 and 88 the operator may rotate the test assembly 44 including the first and second support members 46 and 48 along with the inflated balloon toward the tray 40 shown in FIG. 1. The test assembly 44 may be rotated a sufficient distance in order to position the inflated balloon within the liquid L retained in the tray cavity 42, such that the inflated balloon may be submerged below the surface of the liquid L during testing. Thus, the operator may readily ascertain possible leakage of air from the submerged balloon through visual inspection for air bubbles which rise from the leaking balloon to the surface of the liquid L. Once this test has been completed, the operator may move the test assembly 44 to its upright position where the control device 314 again maintains the first and second support members 46 and 48 of the test assembly 44 in the normal upright configuration.

As shown in FIG. 2, the second support member 48 of the test assembly 44 has an inclined block 334 which is secured to the upright arm 50 with an outer end 336 of the block 334 projecting forwardly from the second support member 48. When the test assembly 44 is moved from its normal first upright position to the second forward position with the inflated balloon and clamp members 80 and 88 submerged in the tray liquid L, the outer end 336 of block 334 strikes the upper surface of the base plate 182 to limit movement of the test assembly 44 at the second submerged position. Thus, the control device 314 acts as a counter-balance for the test assembly 44 to permit movement of the test assembly 44 from its upright position to the submerged position until the block 334 strikes the base plate 182 when the test assembly 44 assumes the submerged position. The test assembly 44 may be maintained in this configuration without further pulling of the test assembly by the operator until a determination of possible leakage from the inflated balloon has been completed, after which the operator may return the test assembly 44 from the submerged position to its normal upright configuration.

Control of the device 20 will first be described in connection with the diagrammatic view of FIG. 8. As shown, the testing apparatus 20 has a suitable air supply 338 which is utilized in conjunction with the various cylinders previously described. The apparatus 20 also has a control system 340 which is utilized to control operation of the device during testing, and it will be further described in connection with FIG. 11. The control system 340 may be constructed in any suitable manner such as in the form of a fluidic circuit, associated with the air supply 338 and the described air cylinders. However, for convenience, the control system 340 will be described in the form of an electrical circuit which is utilized to actuate switches or solenoids associated with the cylinders for control of the device.

With reference to FIGS. 1 and 8, when it is desired to initiate operation of the device, the switch 28 is moved to the closed position in order to connect power from the power supply 342 to the control system 340 and initialize the circuit. At this time, the jaws of both clamp members 80 and 88 are in an open position, and the clamp members 80 and 88 are spaced from each other a distance substantially greater than the length of the balloon to be tested. Next, the operator places one end of the sleeve or balloon on the inflation nozzle 114 of the clamp member 80 in a position with the sleeve end located intermediate the elastic retaining members 170a and 170b of the clamp member 80. As shown, the separate start switches 30 are connected in series to the control system 340. Thus, the device requires simultaneous actuation of both switches 30 to initiate operation of the control system 340, and the switches are placed at spaced locations in order to assure that the operator must use both hands to start the device, such that the operator must remove both hands from the clamp members 80 and 88 as a safety precaution.

Once the start switches 30 have been properly depressed by the operator, the control system 340 actuates a switch or solenoid 346 over a line 348 in order to connect air from the air supply 338 through a supply line 350 to the cylinder 164. In turn, the piston 166 extends from the cylinder 164 and causes closure of the jaws 146a and 146b of the inflation clamp member 80, such that the jaws engage the balloon end in sealing engagement against the inflation nozzle 114 within the jaws.

With reference to FIGS. 1, 7, and 8, after a delay during which the clamp member 80 closes, the control system 340 then actuates a solenoid or switch 352 over a line 354 in order to connect air from supply 338 through line 296 to the two-way cylinder 288 of the drive assembly 266. In turn, the piston 290 of cylinder 288 extends, and moves the drive shaft 274 and associated illumination clamp member 88 toward the balloon. In a forward position of the cylinder piston 290 and the clamp member 88, the illumination member 144 of the clamp member 88 enters the other end of the balloon after which the drive shaft 274 actuates the switch 298 which signals the control system 340 over line 356 that the clamp member 88 is at the desired position relative to the balloon. The control system 340 then actuates a switch or solenoid 358 over line 360 in order to connect the air supply 338 to the cylinder 180 associated with the clamp member 88. In turn, a piston 362 of the cylinder 180 extends, and closes the jaws 146a' and 146b' of the clamp member 88 over the balloon in sealing engagement against the illumination member 144.

After a delay during which the clamp member 88 closes, the control system 340 actuates a switch or solenoid 364 over the line 366 in order to connect the air supply 338 through line 246 to the two-way cylinder 238 of the drive system 217. In turn, the cylinder piston 240 extends from the cylinder 238, and moves the drive shaft 224 and associated clamp member 80 in a direction toward the actuation nozzle 108. When the connection member 82 and associated valve assembly 112 are located at the desired position with the actuation nozzle 108 received within and opening the valve assembly 112, the drive shaft 224 strikes the switches 248 and 252 which signal the control system 340 over respective lines 367 and 369. In response to the switch 252, the control system 340 signals a switch or solenoid 368 over line 370 in order to connect an adjustable air control cylinder 372 associated with the air supply 338 to the actuation nozzle 108. A predetermined amount of air passes from the control cylinder 372 through the actuation nozzle 108, the open valve assembly 112 of the connection member 82, and through the inflation nozzle 114 into the balloon. The control cylinder 372 may be adjusted, as desired, in order to retain a selected amount of air which is utilized to inflate the balloon. As a result, the balloon, which is retained in the closed clamp members 80 and 88, is inflated to an enlarged configuration after which the passage of air from cylinder 372 through the actuation nozzle 108 ceases. At this time, the balloon is in an inflated configuration suitable for testing, as shown in FIG. 10. The control system 340 also actuates a valve or solenoid 376 over line 378 in order to connect the cylinder 308 of the limit assembly 306 to the air supply 338. In turn, the piston 310 and associated abutment member 312 extends a predetermined amount from the cylinder 308.

The signal from actuated switch 248 over line 267 initiates a timer in the control system 340 which times out after the balloon has been inflated and the piston 310 of cylinder 308 has extended. Referring to FIGS. 1, 7, and 8, after the timer times out, the control system 340 then signals the valve or solenoid 364 over line 366 in order to connect the air supply through line 244 to the cylinder 238 and cause retraction of the piston 240 into the cylinder 238. As a result, the piston 240 moves the drive shaft 224 and the associated clamp member 80 away from the actuation nozzle 108 until the valve assembly 112 closes, and the valve assembly 112 is free of obstruction from the actuation nozzle 108. At this time, the control plate of the drive shaft 224 strikes the switch 260 which signals the control system 340 over line 374. Also, the cylinder 238 stops movement of the piston 240, the drive shaft 244, and the associated clamp member 80 with the valve assembly 112 of the connection member 82 free from the actuation nozzle 108 to permit subsequent rotation of the test assembly 44. Since the valve assembly 112 has been closed, the balloon is maintained by the clamp members 80 and 88 in an inflated configuration during the subsequent testing.

When the timer times out, the control system 340 also actuates the solenoid or switch 352 in order to connect the air supply through line 294 of the cylinder 288 and cause retraction of the piston 290. As a result, the piston moves the drive shaft 274 and associated clamp member 88 in a direction away from the clamp member 80 after it has stopped. Accordingly, the piston 290 retracts into the cylinder 288 until the control plate on the drive shaft 274 strikes the extended abutment member 312 in order to stop and limit retraction of the piston 290 into the cylinder 288. In this configuration, the stationary clamp members 80 and 88 are located at a desired spacing relative to each other in order to test the inflated balloon. The control system 340 energizes the light source 140 over line 378 in order to cause passage of light through the light transmitting member 90 to the illumination member 144. Of course, the light source may be continuously energized, if desired. As previously indicated, the illumination member 144 supplies light from the interior of the balloon through the walls of the balloon in order to permit clear visual inspection of the expanded balloon walls, such that the operator may readily determine whether imperfections exist in the balloon, such as areas of weakness, or dirt particles on the inside of the balloon. With reference to FIGS. 1 and 2, the operator may utilize the handle 78 in order to simultaneously rotate the clamp members 80 and 88, as well as the inflated balloon, while the illumination member 144 continuously illuminates the balloon walls from the inside of the balloon. In this manner, the operator may visually inspect the expanded balloon walls circumferentially around the balloon while rotating the clamp members 80 and 88 through use of the handle 78.

Next, the operator may move the test assembly 44 from its first upright position to its second submerged position where the inflated balloon is located below the surface of the liquid L in the tray 40, and the block 334 on the second support member 48 stops forward movement of the test assembly at the submerged position. In the event that the balloon contains imperfections such as pin holes, air quickly passes through the balloon walls, and forms bubbles which may be visually ascertained at the surface of the liquid L. Accordingly, the operator may readily determine whether the balloon has such defects, after which the test assembly 44 may be raised to its upright configuration at which time the testing has been completed.

If the balloon was found to be in an acceptable condition for securement on a catheter shaft, i.e., the balloon did not have imperfections, the operator then presses the accept switch 34 which signals the control system 340 that testing has been completed, and also increments the digital accept counter 38. In the event that the balloon contained defects, the operator depresses the reject switch 32 which signals the control system 340 that testing has been completed, and also increments the digital reject counter 36. Thus, the apparatus 20 maintains a running count of the accepted and rejected balloons through use of the counters 38 and 36 in association with the switches 34 and 32.

After the control system 340 has been signaled by one of the accept or reject switches 34 or 32, the control system 340 signals the switches or solenoids 346 and 358 associated with the cylinders 164 and 180, respectively. In turn, the associated spring biased plungers 166 and 362 retract, and the respective clamp members 80 and 88 open and release the tested balloon. Also, the control system 340 signals the switch or solenoid 376 to retract the spring biased piston 310 into the cylinder 308 and withdraw the abutment member 312 away from the control plate of the drive shaft 274. As a result, the cylinder 288 retracts the piston 290 into the cylinder 288 causing movement of the drive shaft 274 and associated clamp member 88 away from the clamp member 80 until the clamp member 88 reaches the desired position spaced from the clamp member 80 a distance substantially greater than the length of the balloon. At this time, movement of the drive shaft 274 and the clamp member 88 has ceased, and the clamp members 80 and 88 are located at the final position with the clamp members 80 and 88 in an open position disengaged from the balloon. Thus, the operator may remove the tested balloon from one of the clamp members 80 or 88, and may discard the balloon if it has been found defective or may retain the balloon for subsequent use if found in an acceptable condition. After removal of the balloon, the clamp members 80 and 88 are located in a proper spaced and open configuration for immediately testing a subsequent balloon.

The circuitry for the control system 340 is described in more detail in connection with FIG. 11. As shown, the power supply Vcc may be connected to the on-off switch 28. When the switch 28 is closed, a pulse circuitry P1, such as a differentiator circuit, generates a pulse as the reset signal R which is connected through the OR gates OR1, OR2, OR3, OR4, OR5, OR6, and OR7 to various flip flops in the circuit in order to reset the flip flops.

When both start switches 30 are closed, the pulse circuitry P2 generates a pulse which sets flip flop ff1. In turn, the flip flop ff1 signals the solenoid 346 at the Q output of the flip flop which causes closure of the clamp member 80. Also, the pulse from the pulse circuitry P2 triggers the single-shot SS1 which undertakes a delay associated with the time required for closure of the clamp member 80. When the single-shot SS1 times out, the pulse circuitry P3 generates a pulse which sets flip flop ff2 and signals solenoid 352 at the Q output to move the clamp member 88 toward the clamp member 80.

As shown, the switch 298 is connected as an input of an inverter I1, and the output of the inverter is connected as an input to AND gate A1. Also, the Q output of flip flop of ff2 is connected as an input to the AND gate A1, such that the signals from the set flip flop ff2 and switch 298, when closed, pass through the AND gate A1 and cause the pulse circuitry P4 to generate a pulse. In turn, the pulse from pulse circuitry P4 sets the flip flop ff3 which signals the solenoid 358 at its Q output to cause closure of the clamp member 88 when the clamp member has been properly positioned relative to the balloon. In addition, the pulse from the pulse circuitry P4 triggers the single-shot SS2 which undertakes a delay to assure closure of the clamp member 88. When the single-shot SS2 times out, the pulse circuitry P5 generates a pulse and sets the flip flop ff4. The flip flop ff4 then signals the solenoid 364 at its Q output to cause movement of the clamp member 80 toward the left, as viewed in FIG. 1.

Figure 11:
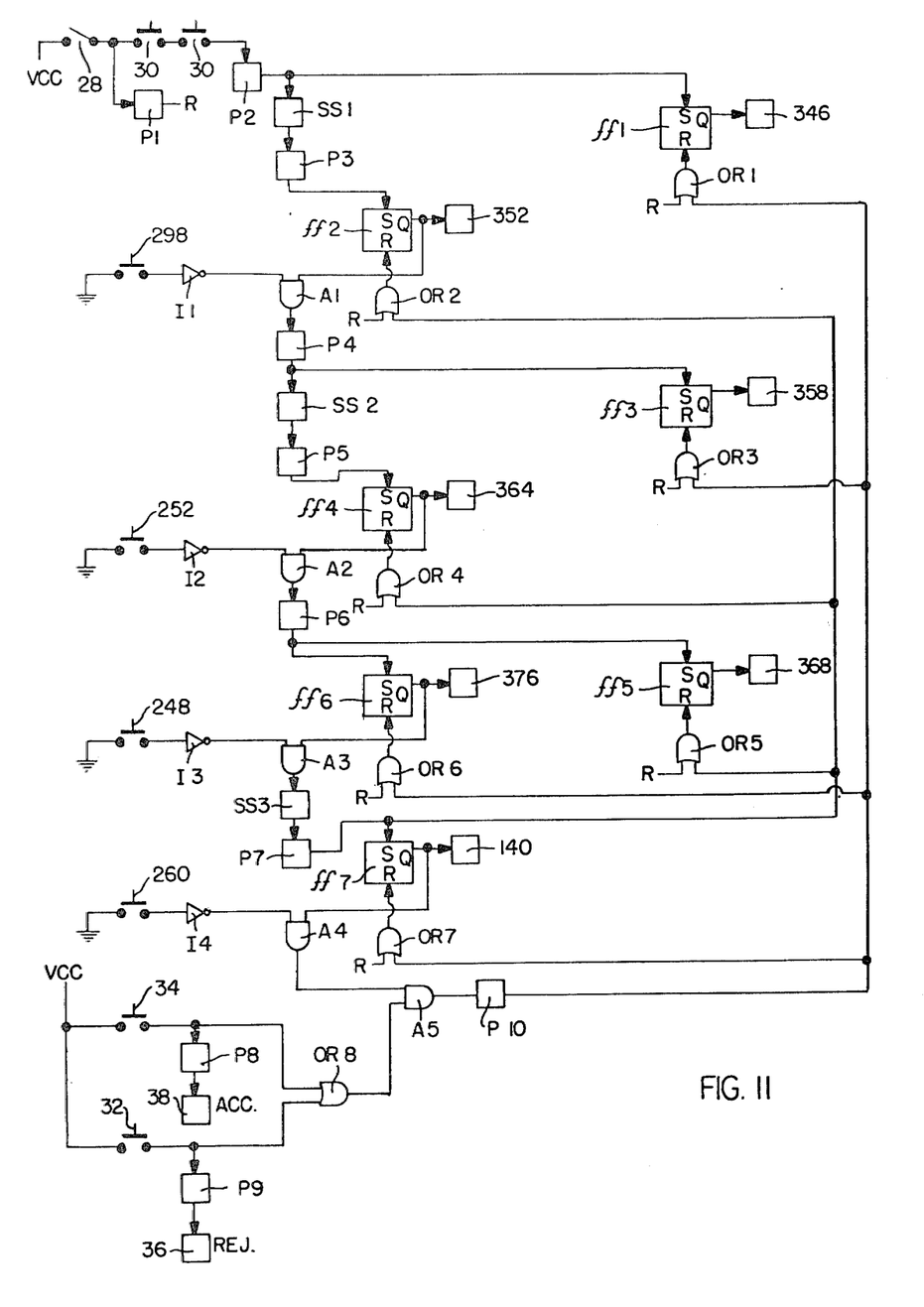
FIG. 11 is a schematic view of a control system for the device.

With reference to FIG. 11, the switch 252 is connected as an input to the inverter I2, and the output of the inverter I2 is connected as an input to the AND gate A2. In addition, the Q output of the flip flop ff4 is connected as an input to the AND gate A2, such that signals from the set flip flop ff4 and the actuated switch 252 pass through the AND gate A2 and cause the pulse circuitry P6 to generate a pulse. The pulse from pulse circuitry P6 sets the flip flop ff5 which signals the solenoid 368 at its Q output in order to cause inflation of the retained balloon. Also, the pulse from pulse circuitry P6 sets the flip flop ff6 which signals the solenoid 376 and causes extension of the associated cylinder piston in order to limit movement of the clamp member 88.

The switch 248 is connected as an input to the inverter I3, and the output of the inverter I3 is connected as an input to the AND gate A3. Also, the Q output of flip flop ff6 is connected as an input to the AND gate A3, such that the signals from the set flip flop ff6 and the switch 248, when closed, cause the single-shot SS3 to undertake a delay which is sufficiently long to assure that the balloon has been inflated and that the piston cylinder associated with the solenoid 376 has extended the desired amount. When the single-shot SS3 times out, the pulse circuitry P7 generates a pulse, and sets the flip flop ff7. In turn, the flip flop ff7 causes energization of the light source 140 preparatory to testing of the balloon. Also, the pulse from the pulse circuitry P7 resets the flip flop ff5 associated with the solenoid 368 through OR gate OR5. The pulse from pulse circuitry P7 is further connected through OR gate OR4 to the flip flop ff4, and resets the flip flop ff4 associated with the solenoid 364 to cause movement of the clamp member 80 in a reverse direction after inflation of the balloon. In addition, the pulse from pulse circuitry P7 is connected to the flip flop ff2 through OR gate OR 2, and resets the flip-flop ff2 associated with the solenoid 352 to cause movement of the clamp member 88 in a direction toward the right, as viewed in FIG. 1.

With reference to FIG. 11, the switch 260 is connected as an input to the inverter I4, and the output of the inverter I4 is connected as an input to the AND gate A4. Also, the Q output of the flip flop ff7 is connected as an input to the AND gate A4, such that the signals from the set flip flop ff7 and the switch 260, when closed responsive to retraction of the clamp member 80, result in a signal through the AND gate A4 to an input of the AND gate A5. At this time, the clamp members 80 and 88 are at the proper position with the balloon retained in an inflated condition to permit testing by the operator.

When testing of the balloon has been completed, the operator depresses one of the accept or reject switches 34 or 32. As shown, the power source Vcc is connected to both switches 34 and 32. Thus, if the switch 34 is closed, a signal from switch 34 passes through the OR gate OR8 to the other input of the AND gate A5. In addition, the closed switch 34 causes the pulse circuitry P8 to generate a pulse and increment the accept counter 38. However, if the switch 32 is closed, a signal from the switch 32 passes through the OR gate OR8 to the second input of the AND gate A5. Also, the closed switch 32 causes the pulse circuitry P9 to generate a pulse and increment the reject counter 36. Thus, once the switch 260 has closed, and one of the two switches 34 and 32 has been closed by the operator, a signal is formed at the output of the AND gate A5, and causes the pulse circuitry P10 to generate a pulse.

As shown, the pulse circuitry P10 is connected to the flip flop ff7 through OR gate OR7, such that the pulse from pulse circuitry P10 resets the flip flop ff7 and causes deenergization of the light source 140. Also, the pulse circuitry P10 resets the flip flop ff6 through OR gate OR6, and causes the cylinder piston associated with the solenoid 376 to retract and permit movement of the clamp member 88 to its final position. Further, the pulse circuitry P10 is connected to the flip flop ff3 through the OR gate OR3, such that the pulse from pulse circuitry P10 resets the flip flop ff3. In turn, the flip flop ff3 signals the solenoid 358, and causes the clamp member 88 to open. In addition, the pulse circuitry P10 is connected to the flip flop ff1 through the OR gate OR1, and the pulse from the pulse circuitry P10 resets the flip flop ff1, such that the associated solenoid 346 causes the clamp member 80 to open. At this time, the clamp member 88 has undertaken movement to its final position, and both the clamp members 80 and 88 have been signalled to open. Once the clamp members 80 and 88 are fully open, the operator may remove the tested sleeve for appropriate disposition depending upon the testing results. In this configuration of the control system 340, the flip flops have all been reset in preparation for testing of a subsequent sleeve, which may be initiated through use of the start switches 30.

Thus, in accordance with the present invention, the apparatus 20 permits testing of a balloon in a simplified manner to determine whether the balloon has imperfections which would prevent its use on a catheter. The device automatically inflates the balloon, and illuminates the walls of the balloon from the inside of the balloon while the balloon is rotated to permit visual inspection of the balloon walls. Further, the inflated balloon may be submerged in a testing liquid to determine whether the balloon contains additional imperfections, such as pin holes. The apparatus may also be utilized to determine a total count of the accepted and rejected balloons. The defective balloons may be discarded, and acceptable balloons may be secured onto the catheter shafts. Thus, imperfections in the balloon may be determined prior to securement onto the catheter shaft, and the device minimizes the possibility that a catheter must be discarded due to discovery of an imperfection in the balloon after securement onto the shaft. The apparatus of the present invention permits testing of balloons in a simplified and efficient manner, and eliminates waste associated with catheters which must be discarded due to a defective balloon only discovered after the balloon has been secured onto the catheter shaft.

The foregoing detailed description is given for clearness of understanding only, and no unnecessary limitations should be understood therefrom, as modifications will be obvious to those skilled in the art.

I claim:

1. A device for testing an elongated elastic sleeve having a pair of opposed ends, comprising:
   first retaining means comprising an elongated support member to receive one end of the sleeve, and a first clamp member having a pair of opposed movable jaws on opposed sides of the support member;
   first means for selectively moving the jaws of the first clamp member between a first open position with the jaws spaced from the support member, and a second closed position with the jaws gripping the sleeve against the support member;
   second retaining means comprising an elongated illumination member to receive the other end of the sleeve, and a second clamp member having a pair of opposed movable jaws on opposed sides of the illumination member;
   second means for selectively moving the jaws of the second clamp member between a first open position with the jaws spaced from the illumination member, and a second closed position with the jaws gripping the sleeve against the illumination member; and
   means for supplying light to the illumination member to illuminate a central portion of the sleeve from within the sleeve.

* * * * *